US011261304B2

United States Patent
Shin et al.

(10) Patent No.: US 11,261,304 B2
(45) Date of Patent: Mar. 1, 2022

(54) POLYIMIDE FILM FORMING COMPOSITION AND POLYIMIDE FILM PRODUCED BY USING SAME

(71) Applicant: LG CHEM, LTD., Seoul (KR)

(72) Inventors: Bo Ra Shin, Daejeon (KR); Cheolmin Yun, Daejeon (KR); Hye Won Jeong, Daejeon (KR); Kyungjun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 377 days.

(21) Appl. No.: 16/345,523

(22) PCT Filed: Oct. 27, 2017

(86) PCT No.: PCT/KR2017/011975
§ 371 (c)(1),
(2) Date: Apr. 26, 2019

(87) PCT Pub. No.: WO2018/080222
PCT Pub. Date: May 3, 2018

(65) Prior Publication Data
US 2019/0276618 A1 Sep. 12, 2019

(30) Foreign Application Priority Data
Oct. 31, 2016 (KR) .................. 10-2016-0143297

(51) Int. Cl.
*C08G 73/10* (2006.01)
*C08J 5/18* (2006.01)
*C08K 5/5465* (2006.01)
*C08G 73/14* (2006.01)
*C08L 79/08* (2006.01)

(52) U.S. Cl.
CPC .............. *C08J 5/18* (2013.01); *C08G 73/10* (2013.01); *C08G 73/1067* (2013.01); *C08G 73/14* (2013.01); *C08K 5/5465* (2013.01); *C08L 79/08* (2013.01); *C08J 2379/08* (2013.01); *C08L 2205/02* (2013.01)

(58) Field of Classification Search
CPC ..... C08L 79/08; C08G 73/10; C08G 73/1078; C08J 2379/08; C09D 179/08
See application file for complete search history.

(56) References Cited

U.S. PATENT DOCUMENTS

| | | | |
|---|---|---|---|
| 5,344,916 A | 9/1994 | Harris et al. |
| 5,599,499 A | 2/1997 | Held et al. |
| 5,607,612 A | 3/1997 | Held et al. |
| 5,645,748 A | 7/1997 | Schiffmann et al. |
| 5,811,769 A | 9/1998 | Schiffmann et al. |
| 5,837,977 A | 11/1998 | Schiffmann et al. |
| 5,858,303 A | 1/1999 | Schiffmann et al. |
| 8,075,824 B2 | 12/2011 | Yoshinaga et al. |
| 10,090,473 B2 | 10/2018 | Kim et al. |
| 10,647,883 B2 | 5/2020 | Yun et al. |
| 10,882,957 B2 | 1/2021 | Jeong et al. |
| 2008/0261060 A1 | 10/2008 | Yamaguchi |
| 2013/0184406 A1 | 7/2013 | Miyazaki et al. |
| 2013/0289202 A1 | 10/2013 | Miyazaki et al. |
| 2015/0091204 A1* | 4/2015 | Uekido ................. B29C 41/003 264/167 |
| 2016/0251545 A1 | 9/2016 | Yun et al. |
| 2017/0165879 A1 | 6/2017 | Miyamoto et al. |
| 2018/0334541 A1 | 11/2018 | Jeong et al. |

FOREIGN PATENT DOCUMENTS

| | | | |
|---|---|---|---|
| CN | 101495548 A | | 7/2009 |
| CN | 102816431 A | | 12/2012 |
| CN | 103788651 A | | 5/2014 |
| CN | 104379339 A | | 2/2015 |
| CN | 105408948 A | | 3/2016 |
| CN | 105637016 A | | 6/2016 |
| EP | 3 016 087 A | | 5/2016 |
| EP | 3150655 A1 | | 4/2017 |
| JP | 2009051891 | * | 3/2009 |
| KR | 10-0435528 B | | 6/2004 |
| KR | 10-0522003 B | | 10/2005 |
| KR | 10-0622026 B | | 9/2006 |
| KR | 10-0873992 B | | 12/2008 |

(Continued)

OTHER PUBLICATIONS

Search Report issued for European Patent Application No. 17 863 849.0 dated Sep. 24, 2019, 5 pages.
G. Ragosta, et al., "Polyimide/silica hybrids via the sol-gel route: High performance materials for the new technological challenges", Express Polymer Letters, 2009, 3(7): pp. 413-428.
J. F. Dezern, et al., "Synthesis and Characterization of Polyamide-Imides", Polymer Engineering and Science, 1991, vol. 31, Issue 12, pp. 860-866.
International Search Report issued for PCT/KR2017/011975 dated Oct. 10, 2018, 2 pages.

*Primary Examiner* — Gregory Listvoyb
(74) *Attorney, Agent, or Firm* — Rothwell, Figg, Ernst & Manbeck, P.C.

(57) ABSTRACT

The present invention provides a polyimide film forming composition which comprises a polyamic acid or a polyimide in an oligomer form or in a low-molecular weight form, the polyamic acid or the polyimide being prepared from a diamine containing an intramolecular imide group, and thus can provide a polyimide film having improved heat resistance while retaining optical properties thereof. In addition, the polyimide film according to the present invention can reduce not only a laser energy density (E/D) required in the laser exfoliation process but also remarkably decrease an amount of ash generated by an exfoliation process, thereby further improving the reliability of a device in a display manufacturing process.

7 Claims, No Drawings

(56) References Cited

FOREIGN PATENT DOCUMENTS

| | | |
|---|---|---|
| KR | 10-2009-0068098 A | 2/2010 |
| KR | 10-1231941 B | 2/2013 |
| KR | 10-2013-0139872 A | 12/2013 |
| KR | 10-2014-0004655 A | 1/2014 |
| KR | 10-2016-0097682 A | 8/2016 |
| TW | 306881 B | 6/1997 |
| TW | 200904855 A | 2/2009 |
| TW | I542618 B | 7/2016 |
| WO | 2014-168402 A1 | 10/2014 |
| WO | 2016-010003 A1 | 1/2016 |

\* cited by examiner

POLYIMIDE FILM FORMING COMPOSITION AND POLYIMIDE FILM PRODUCED BY USING SAME

TECHNICAL FIELD

The application is a 35 U.S.C. § 371 National Phase Entry Application from PCT/KR2017/011975, filed on Oct. 27, 2017, and designating the United States, which claims the benefit of priority to Korean Patent Application No. 10-2016-0143297, filed on Oct. 31, 2016, which are incorporated herein by reference in their entirety for all purpose.

The present invention relates a composition for forming a polyimide film, which is to prepare a polyimide film with enhanced laser lift off characteristic, and a polyimide film manufactured by using same.

BACKGROUND ART

Polyimide (PI) is a polymer having relatively low crystallinity or amorphous structure, and it has advantages such as easy manufacturing process, easy process to make a thin film and no crosslinkable moieties necessary for curing, as well as polymeric properties such as high transparency, excellent flame and chemical resistance, excellent mechanical and electrical properties, and dimensional stability due to its rigid chain structure. The polyimide is now widely used as an electrical and electronical material for the field of car and aerospace, a flexible circuit board, a liquid crystal alignment film for LCD, an adhesive as well as a coating agent.

However, even though the polyimide is a high performance polymer with excellent thermal stability, mechanical properties, chemical resistance and electrical properties, it does not satisfy the basic requirements for the display area such as colorless transparency, and the thermal expansion coefficient should be further lowered. For example, KAPTON sold by Dupont has a low thermal coefficient of about 30 ppm/° C., but it also does not meet the requirement for the plastic substrate. Therefore, now studies for minimizing change in thermal history and optical properties while maintaining the basic properties of the polyimide are underway.

In general, an aromatic polyimide has unique color of dark brown. The reason for this is that electrons can be excited due to σ electrons, π electrons, nonbonding unshared electron pairs within the imide structure, and it can be explained by the theory of charge transfer complex (hereinafter, called CT-complex) induced by π electrons of benzene within a main chain of the polyimide.

In general, the polyimide absorbs light of the wavelength below 400 nm to 500 nm of visible light region, and therefore it shows complementary color of yellow to red. In order to lower the CT-complex that is an disadvantage of the polyimide, a method of introducing an electron-withdrawing functional group having relatively strong electronegativity such as trifluoromethyl ((—$CF_3$), sulfone (—$SO_2$) and ether (—O—) to the main chain of the polyimide is used to lower resonance effect by limiting the movement of π electrons. Also introducing a cyclo-olefin structure instead of benzene to the main chain of the polyimide can reduce π electron density to manufacture a colorless transparent polyimide film.

Meanwhile, polyamide-imide has been widely used as an industrial material in the electrical, mechanical, electronic and aerospace fields due to its excellent properties such as thermal resistance, mechanical strength and electrical property. Also, in general, the structure of the polyamide-imide is different from that of the polyimide and is known to be soluble in an organic solvent, allowing for the application for an enamel varnish, a coating agent for electrical insulation and paint, which need solution casting.

However, for the application in the display area, it is still necessary to develop a polymer for the flexible display with lower thermal expansion coefficient, high solubility, transparency as well as thermal stability.

DISCLOSURE

Technical Problem

An object of the present invention is to provide a composition for forming a polyimide film to provide a polyimide film with enhanced laser lift off characteristic.

Another object of the present invention is to provide a polyimide film manufactured from the composition for forming a polyimide film.

Further another object of the present invention is to provide a method for manufacturing the composition for forming a polyimide film.

Technical Solution

In order to solve the above-mentioned technical problems, the present invention provides a composition for forming a polyimide film which comprises: a first polyimide including a repeating unit of the following Chemical Formula 1-1 or a first polyamic acid including a repeating unit of the following Chemical Formula 1-2; and a second polyamic acid having weight average molecular weight of 50,000 g/mol or more, wherein weight average molecular weight of the first polyimide or the first polyamic acid is 500 g/mol to 40,000 g/mol:

[Chemical Formula 1-1]

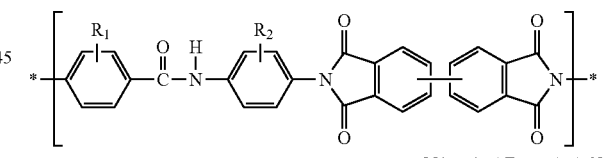

[Chemical Formula 1-2]

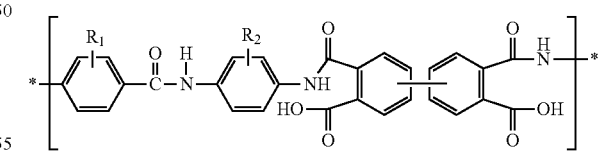

wherein, $R_1$ and $R_2$ are each independently a substituent selected from a halogen atom selected from the group consisting of —F, —Cl, —Br and —I, a hydroxyl group (—OH), a thiol group (—SH), a nitro group (—$NO_2$), a cyano group (—CN), a $C_{1-10}$ alkyl group, a $C_{1-4}$ halogenoalkoxyl group, a $C_{1-10}$ halogenoalkyl group, and a $C_{6-20}$ aryl group.

According to one embodiment, the second polyamic acid may include repeating units of the following Chemical Formula 2 and Chemical Formula 3 together:

[Chemical Formula 2]

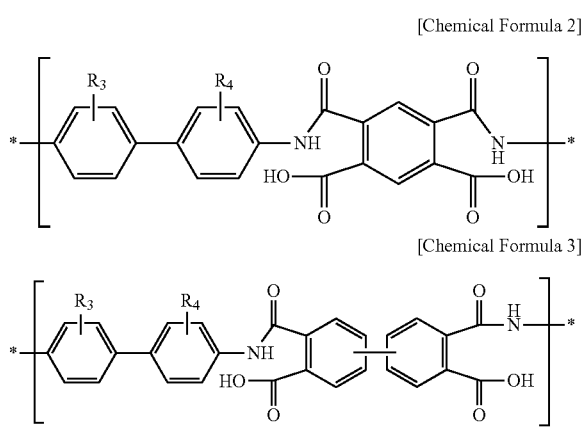

[Chemical Formula 3]

wherein, $R_3$ and $R_4$ are each independently a substituent selected from a halogen atom selected from the group consisting of —F, —Cl, —Br and —I, a hydroxyl group (—OH), a thiol group (—SH), a nitro group (—NO$_2$), a cyano group (—CN), a $C_{1-10}$ alkyl group, a $C_{1-4}$ halogenoalkoxyl group, a $C_{1-10}$ halogenoalkyl group, and a $C_{6-20}$ aryl group.

According to one embodiment, the first polyimide or the first polyamic acid and the second polyamic acid may comprise 3 mol % to 50 mol % of the repeating unit of Chemical Formula 1-1 or Chemical Formula 1-2 based on the total repeating units included in the first polyimide or the first polyamic acid and the second polyamic acid.

According to one embodiment, the first polyimide or the first polyamic acid may include a terminal group including a structure of the following Chemical Formula 4:

[Chemical Formula 4]

wherein, $R_{11}$ is a $C_{1-10}$ alkylene group, and $R_{12}$, $R_{13}$ and $R_{14}$ are each independently selected from a $C_{1-10}$ alkoxyl group, a $C_{6-30}$ aryloxy group and a heterocyclic group containing 1 to 3 oxygen atoms.

Further, the present invention provides a polyimide film manufactured from the composition for forming a polyimide film.

According to one embodiment, the polyimide film is manufactured by a method for manufacturing a polyimide film which comprises the following steps of:

spreading and coating the composition for forming a polyimide film on a carrier substrate to form a polyimide film layer; and laser lifting off to detach the polyimide film layer from the carrier substrate by using laser having a laser energy density (E/D) of 230 mJ/cm$^2$ or less.

According to one embodiment, the polyimide film may have a coefficient of thermal expansion (CTE) of 0 ppm/° C. to 20 ppm/° C. at a heating process after repeating n+1 times (n is an integer equal to or greater than 0) of heating and cooling process in a temperature range of from 100° C. to 300° C.

According to one embodiment, the polyimide film may have Yellow Index (YI) of 15 or less at a thickness of 8 μm to 15 μm, and haze of 2 or less.

In order to solve another object of the present invention, the present invention provides a method for manufacturing a composition for forming a polyimide film which comprises the following steps of:

polymerizing diamine of the following Chemical Formula 5 and tetracarboxylic dianhydride of the following Chemical Formula 6 in an organic solvent to prepare a first polyamic acid or a first polyimide;

polymerizing one or more of tetracarboxylic dianhydrides and one or more of diamines in an organic solvent to prepare a second polyamic acid; and mixing the first polyamic acid or the first polyimide and the second polyamic acid, wherein the first polyamic acid or the first polyimide has a weight average molecular weight of 500 g/mol to 40,000 g/mol, and the second polyamic acid has a weight average molecular weight of 50,000 g/mol or more:

[Chemical Formula 5]

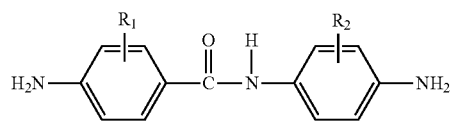

[Chemical Formula 6]

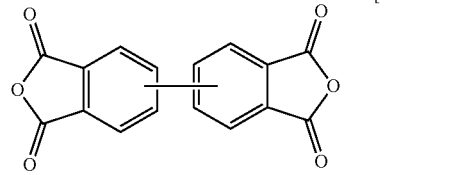

wherein, $R_1$ and $R_2$ are each independently a substituent selected from a halogen atom selected from the group consisting of —F, —Cl, —Br and —I, a hydroxyl group (—OH), a thiol group (—SH), a nitro group (—NO$_2$), a cyano group (—CN), a $C_{1-10}$ alkyl group, a $C_{1-4}$ halogenoalkoxyl group, a $C_{1-10}$ halogenoalkyl group, and a $C_{6-20}$ aryl group.

According to one embodiment, the second polyamic acid may be prepared by polymerizing diamine of the following Chemical Formula 7 and tetracarboxylic dianhydride of the following Chemical Formula 6 and the following Chemical Formula 8 in an organic solvent:

[Chemical Formula 7]

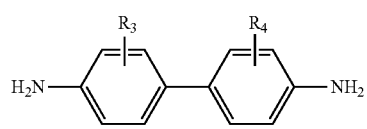

[Chemical Formula 6]

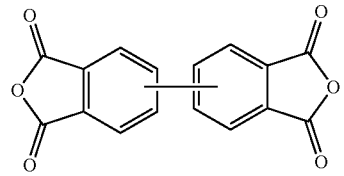

[Chemical Formula 8]

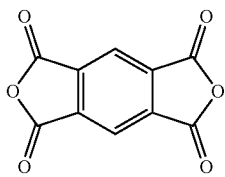

wherein,

R$_3$ and R$_4$ are each independently a substituent selected from a halogen atom selected from the group consisting of —F, —Cl, —Br and —I, a hydroxyl group (—OH), a thiol group (—SH), a nitro group (—NO$_2$), a cyano group (—CN), a C$_{1-10}$ alkyl group, a C$_{1-4}$ halogenoalkoxyl group, a C$_{1-10}$ halogenoalkyl group, and a C$_{6-20}$ aryl group R3.

According to one embodiment, the composition may comprise the diamine of Chemical Formula 5 in an amount of 3 mol % to 50 mol % based on the total amount of the entire diamines used for preparing the first polyimide or the first polyamic acid and the second polyamic acid.

[Chemical Formula 5]

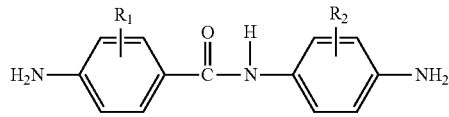

According to one embodiment, a silane compound of the following Chemical Formula 9 may be further added in the step of preparing the first polyamic acid:

[Chemical Formula 9]

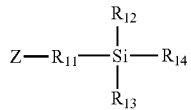

wherein,

Z is an isocyanate group (—N═C═O) or an amine group (—NH$_2$),

R$_{11}$ is a C$_{1-10}$ alkylene group, and

R$_{12}$, R$_{13}$ and R$_{14}$ are each independently selected from a C$_{1-10}$ alkoxyl group, a C$_{6-30}$ aryloxy group and a heterocyclic group containing 1 to 3 oxygen atoms.

According to one embodiment, the composition may comprise the silane compound of Chemical Formula 9 in an amount of from 10 parts by mole to 30 parts by mol based on 100 parts by mol of the first polyamic acid or the first polyimide.

According to one embodiment, the organic solvent may have a positive Log P, and the organic solvent having a positive Log P may be selected from N,N-diethylacetamide (DEAc), N,N-diethylformamide (DEF), N-ethylpyrrolidone (NEP) or a mixture thereof.

Advantageous Effects

The composition for forming a polyimide film according to the present invention comprises an oligomer type or a low molecular type of polyamic acid or polyimide prepared from a diamine having an intramolecular imide group, thereby providing a polyimide film with enhanced heat resistance while maintaining optical properties. Further, the laser energy density (E/D) required for a laser lift off process as well as the amount of ash formed during the ablation process can be significantly reduced by using the polyimide film according to the present invention, and therefore reliability of a device on a process for manufacturing a display can be further enhanced.

BEST MODE CARRYING OUT THE INVENTION

Various changes in form and details may be made to the presently disclosed embodiment and thus should not be construed as being limited to the aspects set forth herein. The presently disclosed embodiment is not limited to the aspects described in the present description, and thus it should be understood that the presently disclosed embodiment does not include every kind of variation example or alternative equivalent included in the spirit and scope of the presently disclosed embodiment. Also, while describing the aspects, detailed descriptions about related well-known functions or configurations that may diminish the clarity of the points of the aspects of the presently disclosed embodiment will be omitted.

Unless particularly stated otherwise herein, all the compounds or organic groups may be substituted or unsubstituted. Herein, the term 'substituted' means that at least one hydrogen atom in such a compound or substituent has been replaced by any one substituent selected from the group consisting of a halogen atom, a C$_{1-10}$ alkyl group, a halogenated alkyl group, a C$_{3-30}$ cycloalkyl group, a C$_{6-30}$ aryl group, a hydroxyl group, a C$_{1-10}$ alkoxyl group, a carboxyl group, an aldehyde group, an epoxy group, a cyano group, a nitro group, an amino group, a sulfonic acid group and derivatives thereof.

Further, unless particularly stated otherwise herein, the term 'combination thereof' means that two or more functional groups are bonded by a single bond, a double bond, a triple bond or a linking group such as a C$_{1-10}$ alkylene group (e.g., methylene group (—CH$_2$), ethylene group (—CH$_2$CH$_2$—), etc.), a C$_{1-10}$ fluoroalkylene group (e.g., fluoromethylene group (—CF$_2$—), a perfluoroethylene group (—CF$_2$CF$_2$—), etc.), a hetero atom such as N, O, P, S or Si, or a functional group containing thereof (e.g., intramolecular carbonyl group (—C(═O)—), ether group (—O—), ester group (—COO—), heteroalkylene group containing —S—, —NH—, —N═N—, etc.), or two or more functional groups are connected by condensation.

In general, a flexible display is embodied by applying OLED technique on a plastic substrate replacing a glass substrate.

In all processes for manufacturing a display, coating/deposition process is conducted on a carrier substrate (for example, glass substrate), and a device formed on the carrier substrate through TFT and module processes is finally detached from the carrier substrate by a laser lift off (LLO) process.

At this time, the LLO characteristic varies according to laser wavelength and a material type of a plastic substrate, and processability is influenced by the amount of laser energy density (E/D) required for detaching the plastic substrate from a carrier substrate or ash formed during the lift off process. Therefore, in order to be used as a material for a flexible substrate, laser characteristic is also an important fact as well as heat resistance and transmittance.

For a polyimide film formed on a substrate, the higher absorption rate for laser wavelength used for lift off, the less energy is required for lift off. Further, according to lift off mechanism, as light (laser) energy absorbed in the polyimide film is converted to heat energy, adhesion force is reduced by thermal deterioration of the polyimide film, and necessarily, ash is formed. The ash thus formed is distributed overall on the rear side of the polyimide film, and may cause reduction of film transmittance, stains and result reliability problem of a device.

Regarding to the laser lift off characteristic, the present invention is to provide a polyimide film with reduced laser energy density (E/D) and ash formation caused by the laser lift off.

The present invention provides a composition for forming a polyimide film which comprises:

a first polyimide including a repeating unit of the following Chemical Formula 1-1 or a first polyamic acid including a repeating unit of the following Chemical Formula 1-2; and a second polyamic acid having a weight average molecular weight of 50,000 g/mol or more, wherein a weight average molecular weight of the first polyimide or the first polyamic acid is 500 g/mol to 40,000 g/mol:

[Chemical Formula 1-1]

[Chemical Formula 1-2]

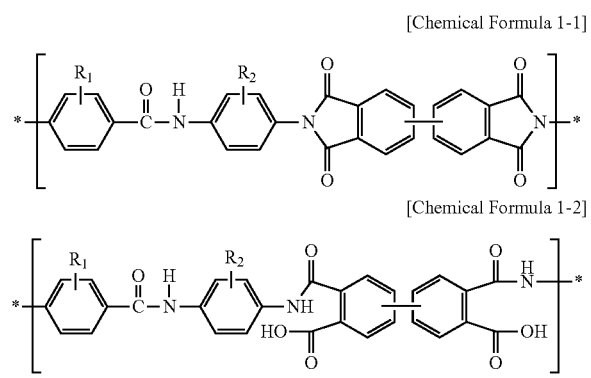

wherein, $R_1$ and $R_2$ are each independently a substituent selected from a halogen atom selected from the group consisting of —F, —Cl, —Br and —I, a hydroxyl group (—OH), a thiol group (—SH), a nitro group (—NO$_2$), a cyano group (—CN), a $C_{1-10}$ alkyl group, a $C_{1-4}$ halogenoalkoxyl group, a $C_{1-10}$ halogenoalkyl group, and a $C_{6-20}$ aryl group. Preferably, it may be a substituent selected from a halogen atom, a halogenoalkyl, an alkyl group, an aryl group and a cyano group, and the alkyl group may be selected from a methyl group, an ethyl group, a propyl group, an isopropyl group, a t-butyl group, a pentyl group and a hexyl group, and the aryl group may be selected from a phenyl group and a naphthalenyl group. For example, the halogen atom may be fluorine (—F), the halogenoalkyl may be a $C_{1-10}$ fluoroalkyl containing a fluorine-based atom selected from a fluoromethyl group, a perfluoroethyl group, a trifluoromethyl group and the like. More preferably, the substituent may be a fluorine atom or a substituent containing a fluorine-based atom such as a fluoroalkyl group.

According to one embodiment, the second polyamic acid may include repeating units of the following Chemical Formula 2 and Chemical Formula 3 together:

[Chemical Formula 2]

[Chemical Formula 3]

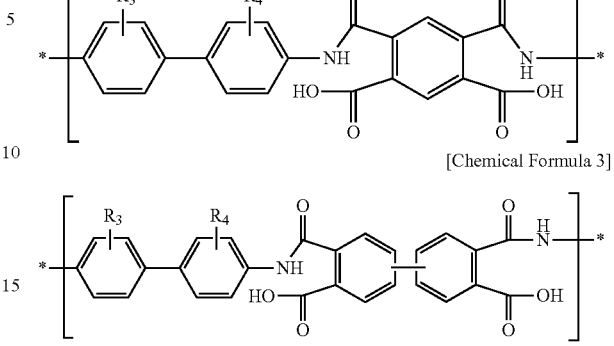

wherein, $R_3$ and $R_4$ are each independently a substituent selected from a halogen atom selected from the group consisting of —F, —Cl, —Br and —I, a hydroxyl group (—OH), a thiol group (—SH), a nitro group (—NO$_2$), a cyano group (—CN), a $C_{1-10}$ alkyl group, a $C_{1-4}$ halogenoalkoxyl group, a $C_{1-10}$ halogenoalkyl group, and a $C_{6-20}$ aryl group. Preferably, it may be a substituent selected from a halogen atom, a halogenoalkyl, an alkyl group, an aryl group and a cyano group, and the alkyl group may be selected from a methyl group, an ethyl group, a propyl group, an isopropyl group, a t-butyl group, a pentyl group and a hexyl group, and the aryl group may be selected from a phenyl group and a naphthalenyl group. For example, the halogen atom may be fluorine (—F), the halogenoalkyl may be a $C_{1-10}$ fluoroalkyl containing a fluorine-based atom selected from a fluoromethyl group, a perfluoroethyl group, a trifluoromethyl group and the like. More preferably, the substituent may be a fluorine atom or a substituent containing a fluorine-based atom such as a fluoroalkyl group.

According to one embodiment, a weight average molecular weight of the first polyimide or the first polyamic acid may be from 500 g/mol to 40,000 g/mol, preferably 500 g/mol to 30,000 g/mol, more preferably 500 g/mol to 20,000 g/mol.

If the molecular weight of the first polyamic acid or the first polyimide is high as 50,000 g/mol or more, optical properties of a polyimide film such as haze characteristic may be sharply deteriorated.

According to one embodiment, a weight average molecular weight of the second polyamic acid may be 50,000 g/mol or more, preferably 80,000 g/mol or more, more preferably 90,000 g/mol or more. Further, the weight average molecular weight of the second polyamic acid may be 180,000 g/mol or less, preferably 150,000 g/mol or less.

According to one embodiment, the composition for forming a polyimide film may comprise the repeating unit of Chemical Formula 1-1 or Chemical Formula 1-2 in an amount of 3 mol % to 50 mol %, preferably 3 mol % to 30 mol %, for example, 5 mol % to 25 mol % based on the total repeating units of the polyamic acids and polyimides, for example, the total repeating units of the first polyimide or the first polyamic acid repeating unit and the second polyamic acid.

According to one embodiment, the first polyimide or the first polyamic acid may include a terminal group having a structure of the following Chemical Formula 4:

[Chemical Formula 4]

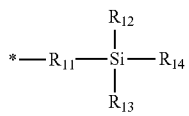

wherein, $R_{11}$ is a $C_{1-10}$ alkylene group, and $R_{12}$, $R_{13}$ and $R_{14}$ are each independently selected from a $C_{1-10}$ alkoxyl group, a $C_{6-30}$ aryloxy group and a heterocyclic group containing 1 to 3 oxygen atoms.

For example, in the polyimide or polyamic acid including the terminal group, the polyimide including the repeating unit of Chemical Formula 1-1 may include a structure such as the following Chemical Formula 4-1 or 4-3, and the polyamic acid including the repeating unit of Chemical Formula 1-2 may include a structure such as the following Chemical Formula 4-2 or 4-4. The weight average molecular weight of the following Chemical Formulas 4-1 to 4-4 may be 500 g/mol to 40,000 g/mol:

spreading and coating the composition for forming a polyimide film on a carrier substrate to form a polyimide film layer; and laser lifting off to detach the polyimide film layer from the carrier substrate by using laser, wherein laser energy density (E/D) during the laser lift off process may be 230 mJ/cm² or less, preferably 220 mJ/cm² or less.

According to one embodiment, the polyimide film may have the coefficient of thermal expansion (CTE) of 0 ppm/° C. to 20 ppm/° C., preferably 0 ppm/° C. to 15 ppm/° C. at a heating process after conducting n+1 times (n is an integer equal to or greater than 0) heating and cooling process in a temperature range of from 100° C. to 300° C.

According to one embodiment, the polyimide film has Yellow Index (YI) of 15 or less at a thickness of 8 μm to 15 μm, and haze of 2 or less.

Further, the present invention provides a method for manufacturing a composition for forming a polyimide film which comprises the following steps of:

polymerizing a diamine of the following Chemical Formula 5 and a tetracarboxylic dianhydride of the following

[Chemical Formula 4-1]

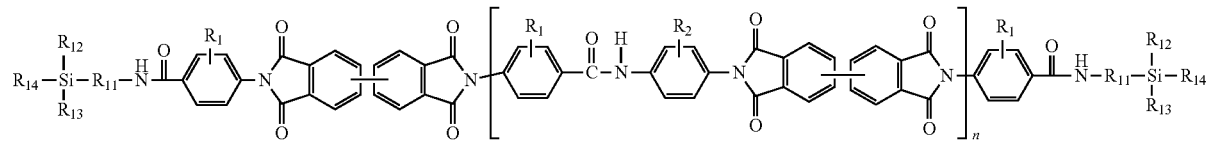

[Chemical Formula 4-2]

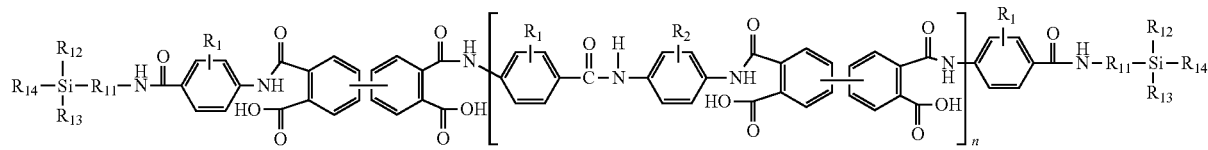

[Chemical Formula 4-3]

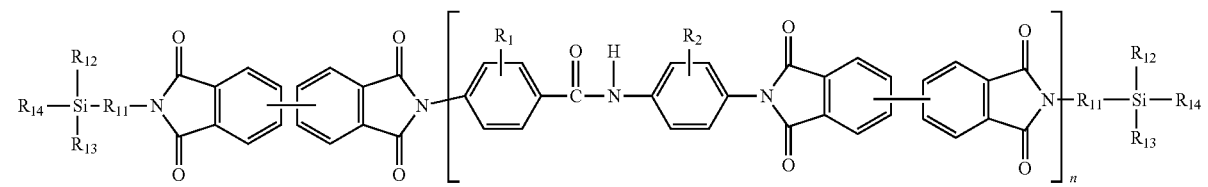

[Chemical Formula 4-4]

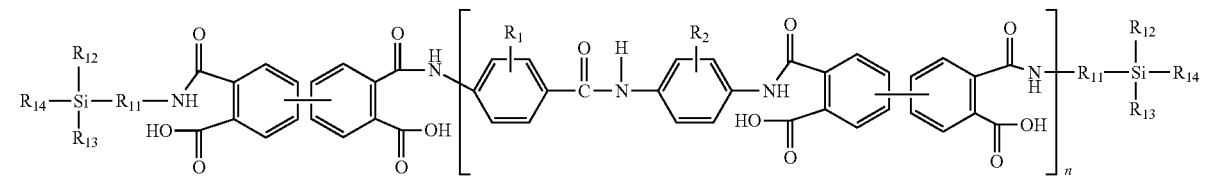

wherein, $R_1$, $R_{11}$, $R_{12}$, $R_{13}$ and $R_{14}$ have the same meanings as defined above, n is the number of repeating of a repeating unit, and it is an integer equal to or greater than 0.

The present invention provides a polyimide film manufactured from the composition for forming a polyimide film.

According to one embodiment, the polyimide film according to the present invention is manufactured by a method for manufacturing a polyimide film which comprises the following steps of:

Chemical Formula 6 in an organic solvent to prepare a first polyamic acid or a first polyimide;

polymerizing one or more of tetracarboxylic dianhydrides and one or more of diamines in an organic solvent to prepare a second polyamic acid having a weight average molecular weight of 50,000 g/mol or more; and mixing the first polyamic acid or the first polyimide and the second polyamic acid, wherein a weight average molecular weight of the first polyamic acid or the first polyimide is 500 g/mol to 40,000 g/mol.

Preferably, the second polyamic acid may be prepared by polymerizing a diamine of the following Chemical Formula 7 and a tetracarboxylic dianhydride of the following Chemical Formula 6 and Chemical Formula 8 together in an organic solvent:

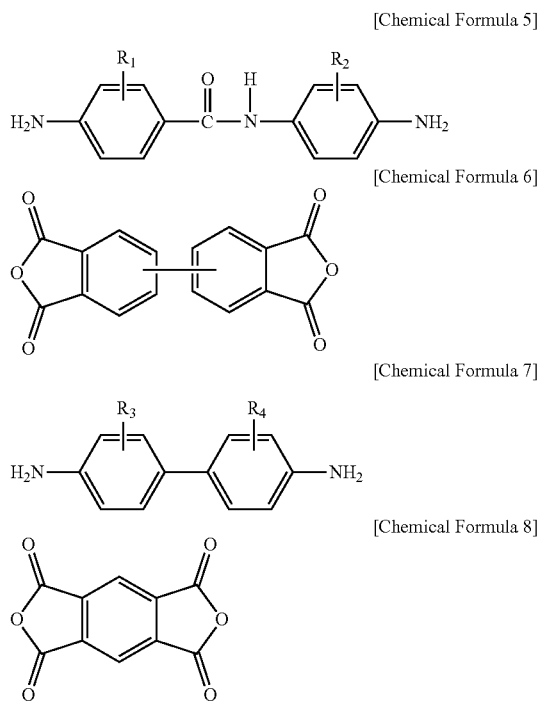

[Chemical Formula 5]

[Chemical Formula 6]

[Chemical Formula 7]

[Chemical Formula 8]

wherein, $R_1$, $R_2$, $R_3$ and $R_4$ may be each independently a substituent selected from a halogen atom selected from the group consisting of —F, —Cl, —Br and —I, a hydroxyl group (—OH), a thiol group (—SH), a nitro group (—$NO_2$), a cyano group (—CN), a $C_{1-10}$ alkyl group, a $C_{1-4}$ halogenoalkoxyl group, a $C_{1-10}$ halogenoalkyl group, and a $C_{6-20}$ aryl group.

According to one embodiment, the composition may comprise the diamine of Chemical Formula 5 in an amount of 3 mol % to 50 mol %, preferably 3 mol % to 30 mol % based on the total amount of the entire diamines.

According to one embodiment, a silane compound of the following Chemical Formula 9 may be further added in the step of preparing the first polyamic acid or the first polyimide:

[Chemical Formula 9]

wherein,

Z is an isocyanate group (—N=C=O) or an amine group (—$NH_2$), $R_{11}$ is a $C_{1-10}$ alkylene group, and $R_{12}$, $R_{13}$ and $R_{14}$ are each independently selected from a $C_{1-10}$ alkoxyl group, a $C_{6-30}$ aryloxy group and a heterocyclic group containing 1 to 3 oxygen atoms.

According to one embodiment, the amount of silane compound of Chemical Formula 9 may be 10 parts by mole to 30 parts by mol based on the first polyamic acid or the first polyimide 100 parts by mol.

The silane compound of Chemical Formula 9 may act as a sealant by being combined with the terminal group of the first polyamic acid or the first polyimide.

According to one embodiment, in the first polyimide or the first polyamic acid, the tetracarboxylic dianhydride may be contained in an excess amount to the amount of the diamine, and preferably, the tetracarboxylic dianhydride and the diamine may be reacted at molar ratio of 1:0.75 to 1:0.99, more preferably at a molar ratio of 1:0.8 to 1:0.99. If the tetracarboxylic dianhydride is contained in an excess amount to the diamine, it may be easier to control viscosity or to enhance optical properties of a polyimide precursor, compared to the case that the tetracarboxylic dianhydride is reacted in an equal amount to the diamine or the case that the diamine is reacted in an excess amount to the tetracarboxylic dianhydride.

The reaction between tetracarboxylic dianhydrides and diamines may be performed according to the conventional polyamic acid polymerization method such as solution polymerization. Specifically, the polyamic acid can be manufactured by dissolving diamines in an organic solvent, adding tetracarboxylic dianhydrides to the mixed solution thus obtained and then polymerizing thereof. The reaction can be performed under inert gas or nitrogen atmosphere, and also can be performed in an anhydrous condition.

Further, the polymerization reaction can be performed at a temperature of −20° C. to 60° C., preferably 0° C. to 45° C. If the reaction temperature is too high, molecular weight may be increased due to increased reactivity, and the viscosity of the polyamic acid solution may be increased. Thus, it may be disadvantageous in the process.

The polyamic acid solution manufactured by the manufacturing method mentioned above may preferably contain the solid in such an amount that the composition has an appropriate viscosity considering processability such as coatability during a film forming process. According to one embodiment, the amount of the polyamic acid solution may be controlled to have the total amount of the entire solution of 5 wt % to 20 wt %, preferably 8 wt % to 18 wt %, more preferably 8 wt % to 12 wt %.

Further, the amount of the polyamic acid solution may be controlled such that the polyamic acid solution has a viscosity of 2,000 cP or more or 3,000 cP or more, and the viscosity of the polyamic acid solution may be controlled to 10,000 cP or less, preferably 9,000 cP or less, more preferably 8,000 cP or less. If the viscosity of the polyamic acid solution is more than 10,000 cP, process efficiency may be deteriorated due to reduced defoamation efficiency when processing the polyimide film, and also electrical, optical and mechanical properties of the manufactured film may be deteriorated due to bad surface profile caused by bubble formation.

Further, the organic solvent, which can be used in the polyamic acid polymerization reaction and the composition for forming a polyimide film, may be a solvent having a positive partition coefficient (Log P value) at 25° C., and more specifically the solvent may have the partition coefficient (Log P value) of 0.01 to 3, 0.01 to 2, or 0.01 to 1. The partition coefficient may be calculated by using an ACD/Log P module of ACD/Percepta platform (ACD/Labs), and the ACD/Log P module uses algorithm based on Quantitative Structure-Property Relationship (QSPR) methodology which uses a 2D structure of a molecule.

The positive partition coefficient means the polarity of the solvent is hydrophobic. According to the study of the present inventors, it can be found that when coating the polyamic acid solution of the composition for forming a polyimide film on a substrate, the dewetting characteristic of the solution may be improved by polymerizing the polyamic acid and manufacturing the composition for forming a polyimide film by using a specific solvent with a positive partition coefficient value. Further, the present invention can control the dewetting phenomenon of the solution by using a solvent having a positive Log P value, without using additives such as a leveling agent, which adjusts the surface tension of a material and the smoothness of a film. Without using additional additives, problems on product quality and process, for example, a low molecular weight material contained in the final product can be solved, and a polyimide film having more uniform characteristics can be obtained.

For example, in the process of coating the composition for forming a polyimide film on a glass substrate, the dewetting phenomenon may occur due to shrinkage of the coated layer when curing or storing the coating solution coated on the substrate under a humidity condition. This dewetting phenomenon of the coating solution may cause variation in thickness of a film, and therefore, due to lack of flexibility of the film, the film may be cut or edges may be broken when cutting, resulting in poor working performance and reduced yield. Further, when fine polar foreign materials are introduced into the coating solution coated on a substrate, in the coating solution containing a polar solvent having a negative Log P value, sporadic cracks and thickness change of the coating may be formed around the position of the foreign material due to the polarity of the foreign material, but in the case of using a hydrophobic solvent having a positive Log P value, the thickness change caused by the cracks of the coating may be reduced or inhibited even in the case that the fine polar foreign materials are introduced.

Specifically, the composition for forming a polyimide film comprising the solvent having Log P as a positive value may have a dewetting rate of 0% to 0.1% as defined by the following Formula 1:

Dewetting rate (%)=[(A−B)/A]×100    [Formula 1]

wherein,

A: The area of the coating solution in the state that the coating solution was completely coated on the substrate (100 mm×100 mm);

B: The area of the coating solution or the polyimide (PI) film after the coating solution or the polyimide film is rolled up from the end of the coated substrate.

Such dewetting phenomenon of the coating solution and the film may occur within 30 min after coating the coating solution, and particularly, because the dewetting is started from the edge, the thickness of the edge may increase.

For example, after coating the composition for forming a polyimide film according to the present invention on a substrate and then storing thereof for 10 min or longer, for example, 10 min or longer, for example, 40 min or longer under a humidity condition, the dewetting rate of the coated solution may be 0.1% or less. For example, even after storing at a temperature of 20° C. to 30° C. and under a humidity condition of 40% or more, more specifically, under a humidity condition of a range from 40% to 80%, i.e., 40%, 50%, 60%, 70% and 80%, respectively, for example, 50%, for 10 min to 50 min, the dewetting rate may be very low as 0.1% or less, preferably 0.05%, more preferably near 0%.

The composition for forming a polyimide film according to the present invention can solve this dewetting phenomenon caused by the shrinkage of the coated layer, thus more improving the yield of a manufacturing process by obtaining a polyimide film with more uniform characteristics.

Further, the density of the solvent according to the present invention may be measured by a standard measuring method of ASTM D1475, and it may be 1 g/cm$^3$ or less. If the density is more than 1 g/cm$^3$, the relative viscosity may be increased and therefore the process efficiency may be reduced.

The solvent which can be used in the present invention may be selected from N,N-diethylacetamide (DEAc), N,N-diethylformamide (DEF), M-ethylpyrrolidone (NEP) or a mixture thereof.

Then, the polyamic acid thus obtained from the above polymerization reaction can be imidized to polyimide by a chemical imidization method or a thermal imidization method.

For example, the polyimide can be obtained by a imidization method using chemical reaction in which a dehydrating agent and an imidization catalyst is added to the polymerized polyamic acid solution and then the resulting solution is heated at a temperature of 50° C. to 100° C., or by a chemical imidization method in which alcohol is removed while refluxing the above solution.

In the chemical imidization method, the imidization catalyst may be pyridine, triethylamine, picoline or quinoline and the like, and in addition, it may be substituted or unsubstituted nitrogen-containing heterocyclic compounds, N-oxide compounds of a nitrogen-containing heterocyclic compound, substituted or unsubstituted amino acid compounds, aromatic hydrocarbon compounds having a hydroxyl group or aromatic heterocyclic compounds. In particular, the catalyst may be imidazole derivatives such as lower alkylimidazoles, for example, 1,2-dimethylimidazole, N-methylimidazole, N-benzyl-2-methylimidazole, 2-methylimidazole, 2-ethyl-4-methylimidazole, 5-methylbenzimidazole and the like; substituted pyridines, for example, isoquinoline, 3,5-dimethylpyridine, 3,4-dimethylpyridine, 2,5-dimethylpyridine, 2,4-dimethylpyridine, 4-n-propylpyridine and the like; p-toluene sulfonic acid and the like.

The dehydrating agent may be an acid anhydride such as acetic anhydride.

Alternatively, the imidization may be performed by coating the composition solution for forming a polyimide film comprising polyamic acid on a substrate and then heat-treating thereof.

The polyamic acid solution may be in the form of a solution dissolved in an organic solvent, and in this case, for example, when the polyamic acid is synthesized in the organic solvent, the solution may be the reaction solution thus obtained itself or a solution obtained by diluting the reaction solution with another solvent. Further, when the polyamic acid is obtained as solid powder, the solution may be a solution obtained by dissolving the powder in an organic solvent.

The present invention provides a method for manufacturing a polyimide film comprising the following steps of:

coating the composition for forming a polyimide film comprising the polyamic acid solution or the polyimide solution on a substrate; and heat-treating the coated composition for forming a polyimide film on the substrate.

After coating the polyimide precursor solution on a substrate, the solution can be heat-treated in an IR oven or a hot air oven, or on a hot plate, and the heat-treatment may be performed at a temperature ranging from 300° C. to 500° C., preferably 320° C. to 480° C., and also may be performed by multi-step heating within the above temperature range. The heat-treating process may be performed for 20 min to 70 min, preferably 20 min to 60 min.

The organic solvent contained in the composition for forming a polyimide film of the present invention may be the same organic solvent used for the above synthesis reaction.

In a range that does not have an influence upon the effect of the present invention a silane coupling agent, a cross-linkable compound, an imidization catalyst for effectively proceeding imidization and the like can be added.

MODE FOR INVENTION

The present invention will be explained in detail with reference to the following examples, including test examples. However, these examples are provided for illustrative purposes only and are not intended to limit the scope of the invention.

DEAc: Diethylacetamide (N,N-diethylacetamide)
TFMB: 2,2'-Bis(trifluoromethyl)-4,4'-biphenyl diamine
DABA: 4,4'-Diaminobenzanilide
PMDA: Pyromellitic dianhydride
BPDA: 3,3',4,4'-Biphenyltetracarboxylic dianhydride
APTEOS: (3-Aminopropyl)triethoxysilane

EXAMPLE

Preparative Example 1 PAA 1
(PMDA:BPDA:TFMB=0.5:0.5:1)

DEAc 50 g was filled in an agitator under nitrogen atmosphere, and then TFMB 10.15 g was dissolved while maintaining the temperature of the reactor to 25° C. PMDA 3.5 g, BPDA 4.72 g and DEAc 50 g were added to the TFMB solution, and dissolved with stirring for a predetermined period of time while maintaining the temperature to 40° C. DEAc was added to the polyamic acid solution prepared from the above reaction to make the solid concentration 10 wt %, so as to prepare a PAA 1 polyamic acid composition. Weight average molecular weight of the PAA 1 polyamic acid prepared above was 101,000 g/mol.

Preparative Example 2 PAA 2(BPDA/DABA=1:1)

DEAc 100 g was filled in an agitator under nitrogen atmosphere, DABA 8.005 g and BPDA 10.5 g were added while maintaining the temperature of the reactor to 25° C., and then dissolved with stirring for a predetermined period of time while maintaining the temperature to 40° C. DEAc was added to the polyamic acid solution prepared from the above reaction to make the solid concentration 10 wt %, so as to prepare a PAA 2 polyamic acid composition. Weight average molecular weight of the PAA 2 polyamic acid prepared above was 121,000 g/mol.

Preparative Example 3 PAA 3(BPDA/DABA=1:0.8)

DEAc 180 g was filled in an agitator under nitrogen atmosphere, DABA 16.69 g and BPDA 27 g were added while maintaining the temperature of the reactor to 25° C., and then dissolved with stirring for a predetermined period of time while maintaining the temperature to 40° C. DEAc was added to the polyamic acid solution prepared from the above reaction to make the solid concentration 20 wt %, so as to prepare a PAA 3 polyamic acid composition. Weight average molecular weight of the PAA 3 polyamic acid prepared above was 10,800 g/mol.

Preparative Example 4 PAA 4(BPDA/DABA=1:0.9)

DEAc 180 g was filled in an agitator under nitrogen atmosphere, DABA 18.77 g and BPDA 27 g were added while maintaining the temperature of the reactor to 25° C., and then dissolved with stirring for a predetermined period of time while maintaining the temperature to 40° C. DEAc was added to the polyamic acid solution prepared from the above reaction to make the solid concentration 20 wt %, so as to prepare a PAA 4 polyamic acid composition. Weight average molecular weight of the PAA 4 polyamic acid prepared above was 18,600 g/mol.

Preparative Example 5 PAA
5(BPDA/DABA=1:0.9)_APTEOS 0.2

DEAc 180 g was filled in an agitator under nitrogen atmosphere, DABA 18.77 g and BPDA 27 g were added while maintaining the temperature of the reactor to 25° C., and then dissolved with stirring for a predetermined period of time while maintaining the temperature to 40° C. APTEOS 4.06 g was added to the polyamic acid solution prepared from the above reaction, and then DEAc was added to the polyamic acid solution prepared from the above reaction to make the solid concentration 20 wt %, so as to prepare a PAA 5 polyamic acid composition. Weight average molecular weight of the PAA 5 polyamic acid prepared above was 19,200 g/mol.

Preparative Example 6 PI 1

DEAc 70 g, toluene 30 g, DABA 10.81 g and BPDA 7.00 g were filled together in an agitator under nitrogen atmosphere, and stirred at 165° C. for 5 hours. Pyridine and acetic anhydride were added to the polyamic acid solution prepared from the above reaction, and then fully stirred at 180° C. Then precipitates were formed with a mixture solution of methanol and water and then dried. The dried polyimide powder was dissolved in DEAc to make the solid concentration of 20 wt %, so as to prepare a PI 1 polyimide composition. Weight average molecular weight of the PI 1 polyimide was 15,600 g/mol.

Preparative Example 7 PI 2

DEAc 70 g, toluene 30 g, 4-aminobenzoic acid 12.12 g and BPDA 13.00 g were filled together in an agitator under nitrogen atmosphere, and stirred at 165° C. for 5 hours. Pyridine and acetic anhydride were added to the polyamic acid solution prepared from the above reaction, and then fully stirred at 180° C. Then precipitates were formed with a mixture solution of methanol and water and then dried. The dried polyimide powder was dissolved in DEAc to make the solid concentration of 20 wt %. 3-(triethoxysilyl)propyl isocyanate 10.93 g was added to the polyimide solution 63 g prepared from the above reaction and stirred for a predetermined time to prepare a PI 2 polyimide composition. Weight average molecular weight of the PI 2 polyimide was 1,200 g/mol.

Comparative Example 1

PAA 1 polyamic acid solution was used.

Comparative Example 2

PAA 1 polyamic acid composition and PAA 2 polyamic acid composition were mixed to meet the composition of diamine and acid dianhydride listed in Table 1 to prepare a composition for forming a polyimide film.

Comparative Example 3
PMDA:BPDA:TFMB:DABA=0.45:0.55:0.9:0.1

DEAc 50 g was filled in an agitator under nitrogen atmosphere, and then TFMB 9.79 g and DABA 0.772 g were dissolved while maintaining the temperature of the reactor to 25° C. PMDA 3.34 g and BPDA 5.50 g were added to the TFMB solution together with DEAc 60 g, and dissolved with stirring for a predetermined period of time while maintaining the temperature to 40° C. DEAc was added to the polyamic acid solution prepared from the above reaction to make the solid concentration 10 wt %, so as to prepare a composition for forming a polyimide film.

Comparative Example 4
PMDA:BPDA:TFMB:DABA=0.35:0.65:0.7:0.3

DEAc 50 g was filled in an agitator under nitrogen atmosphere, and then TFMB 7.52 g and DABA 2.29 g were dissolved while maintaining the temperature of the reactor to 25° C. PMDA 2.60 g and BPDA 6.50 g were added to the TFMB solution together with DEAc 60 g, and dissolved with stirring for a predetermined period of time while maintaining the temperature to 40° C. DEAc was added to the polyamic acid solution prepared from the above reaction to make the solid concentration 10 wt %, so as to prepare a composition for forming a polyimide film.

Comparative Example 5
PMDA:BPDA:TFMB:DABA=0.25:0.75:0.5:0.5

DEAc 50 g was filled in an agitator under nitrogen atmosphere, and then TFMB 5.37 g and DABA 3.81 g were dissolved while maintaining the temperature of the reactor to 25° C. PMDA 1.85 g and BPDA 7.50 g were added to the TFMB solution together with DEAc 55 g, and dissolved with stirring for a predetermined period of time while maintaining the temperature to 40° C. DEAc was added to the polyamic acid solution prepared from the above reaction to make the solid concentration 10 wt %, so as to prepare a composition for forming a polyimide film.

Examples 1~7

The polyamic acid or polyimide compositions prepared in Preparative Examples 1 to 7 were mixed to meet the composition listed in Table 2, so as to prepare compositions for forming a polyimide film.

Preparation of Polyimide Film

The composition for forming a polyimide film prepared in Comparative Examples 1 to 5 and Examples 1 to 7 was spin coated on a glass substrate. The glass substrate coated with the composition for forming a polyimide film was put into an oven and heated at a rate of about 5° C./min, and heat-treated at 430° C. for a curing process. After completing the curing process, laser of wavelength of 308 nm was irradiated on the polyimide film formed on the glass substrate for laser lift off of the polyimide film.

Test Example 1

The film manufactured by the above film manufacturing method was prepared as a sample in thickness of 8 μm to 12 μm and size of 5×20 mm, and the sample was loaded using an accessory. The length of the films measured actually was the same as 16 mm, and the force pulling the film was set to 0.02 N. The thermal expansion change pattern, when the 1$^{st}$ heating process and cooling process were performed within the temperature ranging from 100° C. to 300° C. at a heating rate of 5° C./min and then the 2$^{nd}$ heating process was performed within the temperature ranging from 300° C. to 100° C. at a cooling rate of 4° C./min, was measured with TMA (Q400, TA Instruments). At this time, an inflection point shown in a temperature rising section during the 1$^{st}$ heating process was regarded as Tg.

Haze was measured by the method according to ASTM D1003 using Haze Meter HM-.

Yellowness Index (YI) was measured by using a color-difference meter (Color Eye 7000A).

Energy Density (E/D) of laser applied when detaching the polyimide film was measured using Excimer Laser (308 nm, Coherent).

TABLE 1

| | Comparative Example 1 | Comparative Example 2 | Comparative Example 3 | Comparative Example 4 | Comparative Example 5 |
|---|---|---|---|---|---|
| Solution Polymerization method | 1-pot copolymer | PAA1 PAA2 blending | 1-pot copolymer | 1-pot copolymer | 1-pot Copolymer |
| Diamine Composition (mol %) TFMB/DABA | 100/0 | 90/10 | 90/10 | 70/30 | 50/50 |
| Dianhydride Composition (mol %) PMDA/BPDA | 50/50 | 45/55 | 45/55 | 35/65 | 25/75 |
| Solution state | Clear | Hazy | Clear | Clear | Clear |
| Thickness | 9.3 | — | 9.9 | 9.8 | 10.4 |
| Y.I. | 7.1 | — | 16.8 | 28.5 | 36.8 |
| Haze | 0.9 | — | 3.3 | 3.2 | 0.7 |
| CTE 2$^{nd}$ Heating (100-300° C.) | 15.5 | — | 36.5 | 22.7 | 3.6 |
| Tg(° C.) | 363 | — | 335 | 335 | 345 |
| Laser E/D (mJ/cm$^2$) | 250 | — | 210 | 190 | 180 |

TABLE 2

| | Example 1 | Example 2 | Example 3 | Example 4 | Example 5 | Example 6 | Example 7 |
|---|---|---|---|---|---|---|---|
| Solution | PAA1 | PAA1 | PAA1 | PAA1 | PAA1 | PAA1 | PAA1 |
| | PAA3 | PAA3 | PAA4 | PAA5 | PAA4 | PI1 | PI2 |
| Polymerization method | blending | blending | blending | blending | blending | blending | blending |
| Diamine Composition (mol %) TFMB/DABA | 95/5 | 90/10 | 90/10 | 70/30 | 50/50 | 90/10 | 95/5 |
| Dianhydride Composition (mol %) PMDA/BPDA | 47.5/52.5 | 45/55 | 45/55 | 45/55 | 40/60 | 45/55 | 47.5/52.5 |
| Solution state | Clear | Clear | Clear | Clear | Clear | Clear | Clear |
| Thickness | 10.2 | 9.9 | 10.3 | 9.5 | 10 | 10.5 | 9.5 |
| Y.I. | 8.1 | 10 | 12.9 | 12.8 | 17.5 | 13.6 | 12.5 |
| Haze | 0.6 | 0.8 | 0.9 | 1.2 | 1.2 | 1.1 | 1.0 |
| CTE $2^{nd}$ Heating (100-300° C.) | 13.9 | 12.5 | 12.2 | 5.6 | 5.0 | 6.5 | 8.8 |
| Tg (° C.) | 360 | 362 | 365 | 353 | 372 | 370 | 360 |
| Laser E/D (mJ/cm$^2$) | 220 | 210 | 210 | 210 | 200 | 210 | 210 |

As can be seen from Table 1 and Table 2, Example 1 to Example 7, which were manufactured by mixing (blending) the BPDA-DABA polyamic acid or polyimide having low molecular weight to the PAA 1 polyamic acid, could maintain transparency of a polyimide solution. On the contrary, the polyimide solution of Comparative Example 2, which has the same structure but include the BPDA-DABA polyamic acid having a higher molecular weight lost transparency of a polyimide solution.

It can be found that the polyimide films of Example 1 to Example 7 having low laser E/D value had excellent laser lift off characteristic, also maintained optical properties such as YI and haze, and also had excellent heat resistance due to its low CTE value.

On the contrary, Comparative Example 1 not including the BPDA-DABA structure has very high E/D value, and Comparative Examples 3 to 5 manufactured by copolymerization method not blending showed low laser E/D value because of including the BPDA-DABA structure, but bad optical properties due to its high YI and haze, and also had bad heat resistance due to its high CTE value.

Although specific embodiments of the present invention are described in detail as described above, it will be apparent to those skilled in the art that the specific description is merely desirable exemplary embodiment and should not be construed as limiting the scope of the present invention. Therefore, the substantial scope of the present invention is defined by the accompanying claims and equivalent thereof.

The invention claimed is:

1. A composition for forming a polyimide film which comprises:
   a first polyimide including a repeating unit of the following Chemical Formula 1-1 or a first polyamic acid including a repeating unit of the following Chemical Formula 1-2; and
   a second polyamic acid having a weight average molecular weight of 50,000 g/mol or more,
   wherein the first polyimide or the first polyamic acid has a weight average molecular weight of 500 g/mol to 40,000 g/mol:

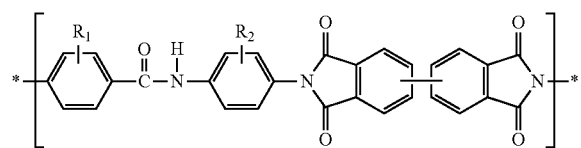

[Chemical Formula 1-1]

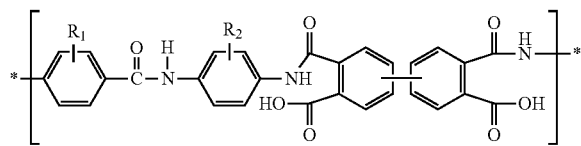

[Chemical Formula 1-2]

wherein,
R$_1$ and R$_2$ are each independently hydrogen atom or a substituent selected from a halogen atom, a hydroxyl group (—OH), a thiol group (—SH), a nitro group (—NO$_2$), a cyano group (—CN), a C$_{1-10}$ alkyl group, a C$_{1-4}$ halogenoalkoxyl group, a C$_{1-10}$ halogenoalkyl group, and a C$_{6-20}$ aryl group.

2. The composition for forming a polyimide film according to claim 1, wherein the second polyamic acid includes repeating units of the following Chemical Formula 2 and Chemical Formula 3:

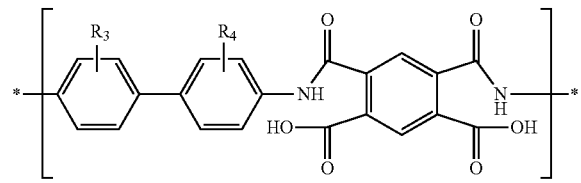

[Chemical Formula 2]

[Chemical Formula 3]

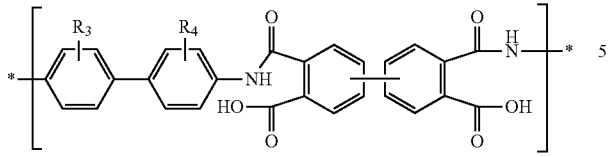

wherein,

R₃ and R₄ are each independently hydrogen atom or a substituent selected from a halogen atom, a hydroxyl group (—OH), a thiol group (—SH), a nitro group (—NO₂), a cyano group (—CN), a $C_{1-10}$ alkyl group, a $C_{1-4}$ halogenoalkoxyl group, a $C_{1-10}$ halogenoalkyl group, and a $C_{6-20}$ aryl group.

3. The composition for forming a polyimide film according to claim 2, wherein the amount of the repeating unit of Chemical Formula 1-1 or Chemical Formula 1-2 is from 3 mol % to 50 mol % based on the total repeating units of the first polyimide or the first polyamic acid and the total repeating units of the second polyamic acid.

4. The composition for forming a polyimide film according to claim 1, wherein the first polyimide or the first polyamic acid includes a terminal group including a structure of the following Chemical Formula 4:

[Chemical Formula 4]

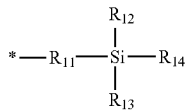

wherein, $R_{11}$ is a $C_{1-10}$ alkylene group, and $R_{12}$, $R_{13}$ and $R_{14}$ are each independently selected from a $C_{1-10}$ alkoxyl group, a $C_{6-30}$ aryloxy group and a heterocyclic group containing 1 to 3 oxygen atoms.

5. A polyimide film comprising a heat-cured composition of claim 1.

6. A polyimide film according to claim 5, which shows coefficient of thermal expansion (CTE) of 0 ppm/° C. to 20 ppm/° C. at a heating process after repeating n+1 times (n is an integer equal to or greater than 0) heating and cooling process in a temperature range of from 100° C. to 300° C.

7. The polyimide film according to claim 5, wherein a yellow index (YI) of the film is 15 or less at a thickness of 8 μm to 15 μm, and a haze of the film is 2 or less.

* * * * *